United States Patent [19]
Schnitzius et al.

[11] Patent Number: 5,158,268
[45] Date of Patent: Oct. 27, 1992

[54] POSITIONING DEVICE

[75] Inventors: Klaus Schnitzius, Rheinbrohl; Ulrich Baum, Koblenz; Castor Furhmann, Brachtendorf, all of Fed. Rep. of Germany

[73] Assignee: Stabilus GmbH, Koblenz-Neuendorf, Fed. Rep. of Germany

[21] Appl. No.: 624,707

[22] Filed: Dec. 6, 1990

[30] Foreign Application Priority Data

Dec. 12, 1989 [DE] Fed. Rep. of Germany ....... 3940916

[51] Int. Cl.⁵ .......................... F16F 5/00; F16F 9/32; F16F 9/44
[52] U.S. Cl. ................. 267/64.12; 188/300; 267/64.26
[58] Field of Search ...................... 188/300, 67, 322.17, 188/322.12, 322.19; 267/64.12, 64.11, 120, 64.13, 64.26; 92/13, 13.4, 13.6

[56] References Cited

U.S. PATENT DOCUMENTS

| | | | |
|---|---|---|---|
| 2,349,244 | 5/1944 | Brown | 188/300 X |
| 4,236,609 | 12/1980 | Carlsson | 188/67 |
| 4,449,702 | 5/1984 | Hasegawa | 188/300 X |
| 4,611,794 | 9/1986 | Taylor | 267/64.13 |
| 4,848,524 | 7/1989 | Hosan et al. | 267/64.26 X |
| 4,867,317 | 9/1989 | Wildemann et al. | 267/64.12 |

FOREIGN PATENT DOCUMENTS

| | | |
|---|---|---|
| 2415204 | 10/1974 | Fed. Rep. of Germany . |
| 3433735 | 3/1986 | Fed. Rep. of Germany . |
| 3531229 | 3/1987 | Fed. Rep. of Germany . |
| 2165688 | 8/1973 | France . |
| 2230220 | 12/1974 | France . |
| 2036247 | 6/1980 | United Kingdom . |
| 2231936 | 11/1990 | United Kingdom ................ 188/300 |

OTHER PUBLICATIONS

The Photos Of Exhibits 1-4 Showing Prior Art Positioning Devices.

Primary Examiner—Robert J. Oberleitner
Assistant Examiner—Peter M. Poon
Attorney, Agent, or Firm—Brumbaugh, Graves, Donohue & Raymond

[57] ABSTRACT

According to an illustrative example of the invention, a gas spring is combined with a telescopic tube which is axially slidable on the cylinder of the gas spring. The piston rod and the telescopic tube are provided at the respective most remote ends thereof with fastening eyes. The telescopic tube can be fixed in a plurality of positions with respect to the cylinder. For such fixation, the cylinder is connected with a carrier within the telescopic tube between opposite end walls of the cylinder and the telescopic tube. A locking bolt is guided within the carrier in a direction transverse to the axis of the telescopic tube. This locking bolt is engageable with a corresponding plurality of openings of the telescopic tube. The locking bolt is biased by a spring into an engagement position with respect to a respective opening and can be released from such engagement by being inwardly pressed by an operator.

24 Claims, 3 Drawing Sheets

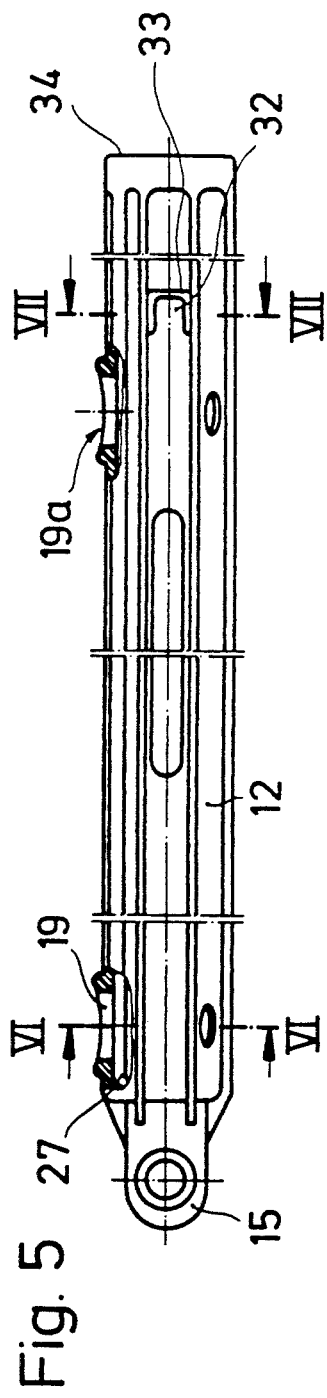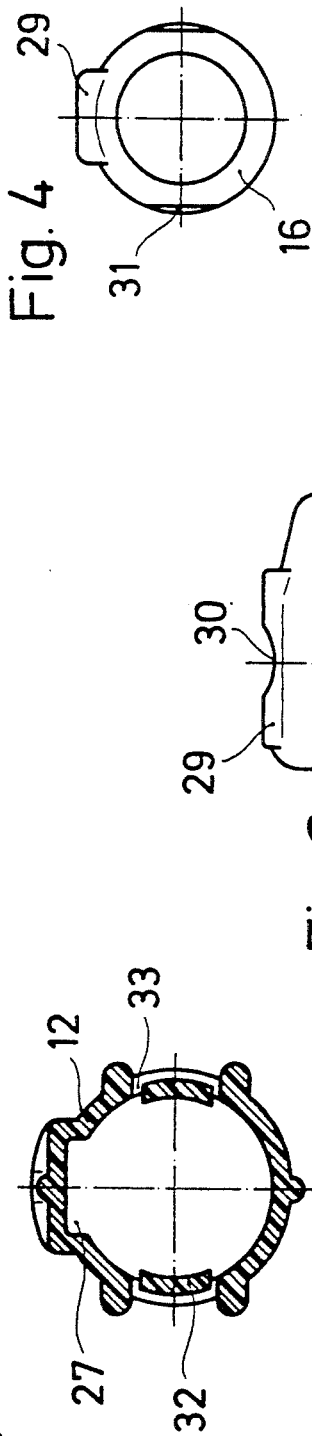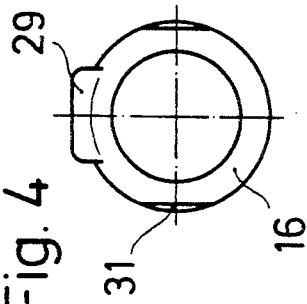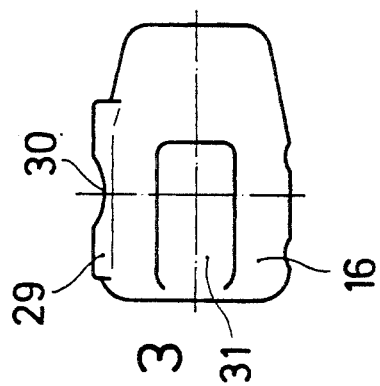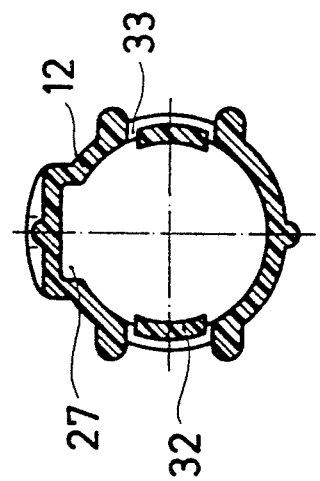

POSITIONING DEVICE

BACKGROUND OF THE INVENTION

This invention relates to a positioning device for positioning an engine bonnet or a boot lid of a motor vehicle. Such positioning devices are commonly in use and comprise primarily a gas spring, which gas spring assists a lifting movement of the respective engine bonnet or boot lid. Alternatively, the gas spring is replaced by a so-called oil support, which is also a cylinder piston device and has a primary function of maintaining the engine bonnet or boot lid in a raised position. Frequently, the gas spring or oil support has only a limited stroke, such that the bonnet or boot lid can only be positioned in a normal opening position which is sufficient for normal loading of the luggage space of the motor vehicle and for performing normal service steps at the engine. Sometimes it is necessary, however, to open the engine bonnet or boot lid beyond said normal opening position, e. g. if the engine is to be removed from the motor vehicle. For allowing such further opened position of the boot lid or engine bonnet, it is known to provide a telescopic tube on the cylinder of the gas spring or oil support. This telescopic tube can be moved with respect to the cylinder and locked with respect to the cylinder in a position corresponding to said further opened position of the engine bonnet or boot lid.

STATEMENT OF THE PRIOR ART

From German Offenlegungsschrift 34 33 735 a positioning device is known, which comprises a gas spring and a telescopic tube slidingly movable on the cylinder of the gas spring. For locking the telescopic tube with respect to the cylinder of the gas spring in a predetermined position, a locking member is pivotably mounted on the telescopic tube about a diagonal axis thereof. By pivoting this locking member, the locking member can be brought at wish in a locking position and in an unlocking position with respect to the cylinder. The locking member is provided on the outer side of the telescopic tube. The total dimensions of the telescopic tube are increased by the locking member. The aesthetic appearance of the total device is negatively influenced. There is a risk that the operator injures his hands when handling the locking device.

OBJECT OF THE INVENTION

One object of the present invention is to provide a positioning device in which the locking member can be accommodated within the telescopic tube without substantially increasing the dimensions thereof and particularly without increasing the cross-sectional dimensions of the positioning device.

A further object of the present invention is to provide a positioning device which can be locked in a plurality of positions and more particularly in a first relative position of a minimum length corresponding to the normal opening position of the engine bonnet or boot lid and in a second position corresponding to an extreme opening position of the engine bonnet and the boot lid, respectively.

Further objects of the inventions are to provide a positioning device of simple and economic design and of easy operability.

SUMMARY OF THE INVENTION

A positioning device is intended for positioning two relatively movable construction elements in respective relative positions. This positioning device comprises a cylinder piston unit. This cylinder piston unit has a first member, namely a cylinder member, with an axis and two ends and a second member, namely a piston rod member, axially extending through one of said two ends. The positioning device further comprises a telescopic tube axially movably guided on one of said first and second members. The telescopic tube is axially lockable with respect to said one member by releasable locking means. The telescopic tube is provided with first fastening means for being fastened to one of said construction elements. The other one of said first and second members is provided with second fastening means for being fastened to the other one of said construction elements.

The releasable locking means comprise a locking element axially fixed with respect to said one of said first and second members and at least one locking catch means axially fixed with respect to said telescopic tube. The locking element is engageable into and disengageable from said locking catch means by respective movements with respect to said one member substantially transverse to said axis.

As the locking element is axially fixed with respect to the respective first or second member, it can be easily accommodated within the telescopic tube so that the locking element is protected against being damaged in use and cannot injure the operator. The locking element can be housed between respective opposite ends of the cylinder and of the telescopic tube so that the diameter of the positioning device is not increased by the presence of the locking element. The locking catch means can be provided at any location along the length of the telescopic tube so that various relative positions of the respective member and the telescopic tube can be selected for locking engagement.

The locking element may be biased by a spring force towards engagement with the locking catch means and may be releasable from engagement with the locking catch means by an operator. So, the operability of the positioning device is very easy.

The locking catch means may be provided by a substantially radially directed opening of the telescopic tube. Such a catch means can be provided in a very simple and economic way.

The locking element is preferably non-rotatable with respect to the locking catch means. So, the operability is very easy, because there is no need for searching the respective position of locking engagement. E. g. the locking element is axially guided by a guiding groove provided on an internal face of said telescopic tube.

According to a preferred embodiment, the locking element is substantially radially guided within a carrier fastened to said one member. The carrier and the locking element may be manufactured by conventional techniques, such as injection moulding of plastic or metal.

The carrier may be fastened to said one member at one end thereof which first enters into said telescopic tube, when assembling said cylinder piston unit and telescopic tube. So, the carrier is always accommodated within the telescopic tube, irrespective of the relative position.

The carrier may be fastened to an axially extending fastening pin of said one member. Such a fastening pin is always available on conventional gas springs and oil supports of series production for providing a fastening eye or the like, when the gas spring or oil support is used without a telescopic tube. Such, it is possible to use conventional gas springs and oil supports with slightest modifications if any.

The carrier may be axially guided within the telescopic tube by the internal surface thereof.

The carrier may be non-rotatably guided within the telescopic tube. This makes sure that even during disengagement of the locking element and the catch means, relative rotation of the telescopic tube and the respective member is inhibited. So, no situation can occur in which finding of the correct relative position for engagement makes difficulties. E. g. the carrier may have a projection engaging into a substantially axially extending guiding groove provided at an internal surface of the telescopic tube. This projection remains in engagement with the groove, even when the locking element is out of engagement with the respective catch means.

The locking element may be substantially radially guided within a substantially radially extending guiding bore of the carrier. This facilitates easy manufacturing of both the locking element and the carrier.

The locking element may be biased towards engagement with the locking catch means by spring means located within the guiding bore. The spring means may be supported by a bottom face of the guiding bore and act onto an inner end face of the locking element located within the guiding bore. This again facilitates manufacturing.

The locking element may be provided with snap means snappingly engaging snap shoulder means, when said locking element is inserted into said guiding bore. These snap means and snap shoulder means define an engagement position of the locking element within the guiding bore, in which engagement position said locking element engages said locking catch means.

The telescopic tube may be provided with radially inwardly biased spring tongues engaging an external face of said one member. These spring tongues prevent radial wobbling of the telescopic tube with respect to the member engaged thereby. Moreover, the axial movement of the telescopic tube with respect to the respective member is damped. Such damping may be of advantage, if e. g. a strong wind force acts onto the engine bonnet or boot lid during relative movement of the telescopic tube and the respective member. The spring tongues may be distributed about the axis.

The carrier may be in screw engagement with the respective member. In such case, the carrier may be provided with at least one key surface for applying a screwing tool. So, the assembling of the positioning device is considerably facilitated.

According to a preferred embodiment, said one member is the cylinder member. Alternatively, it is, however, possible to provide the telescopic tube on the piston rod member.

First locking catch means may be provided on the telescopic tube at a location corresponding to a most inward position of said one member within said telescopic tube; the second locking catch means may be provided on the telescopic tube at a location corresponding to a most outward position of the respective member within the telescopic tube.

The invention further relates to a positioning device for positioning two relatively movable construction elements in respective relative positions. Again, the positioning device comprises a cylinder piston unit. The cylinder piston unit has a first member, namely a cylinder member, with an axis and two ends and a second member, namely a piston rod member, axially extending through one of said two ends. A telescopic tube is axially movably guided on one of said first and second members. This telescopic tube is axially lockable with respect to said one member by releasable locking means. The telescopic tube is provided with first fastening means for being fastened to one of said construction elements. The other one of said first and second members is provided with second fastening means for being fastened or connected to the other one of said construction elements.

The releasable locking means are adapted for axially locking said telescopic tube with respect to said one member in a plurality of, at least two, axially spaced relative positions.

The cylinder piston unit may preferably be a gas spring, which simultaneously helps to lift the bonnet or boot lid.

Alternatively, the cylinder piston unit may be a so-called oil support, which does not provide a lifting force, but helps to locate the engine bonnet or boot lid in a desired normal opening position.

In case of a gas spring, the piston rod member of said gas spring may be axially biased with respect to the cylinder member towards an outermost position by a volume of pressurized gas.

By the term "relatively movable construction elements" one may understand e. g. a framework of a motor vehicle on the one hand and an engine bonnet or boot lid on the other hand.

With the positioning device of the present invention, when providing a plurality of locking catch means, the relative position of the telescopic tube with respect to the respective member is always locked in both directions. Thus, it is warranted that the boot lid or engine bonnet can never be moved by heavy wind conditions towards a position in which the sliding engagement of the cylinder piston device and the telescopic tube is lost.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which

FIG. 3 is a detailed view of a carrier of the locking element;

FIG. 4 is a front view of the carrier according to FIG. 3;

FIG. 5 is a side view of a telescopic tube with catch openings and spring tongues;

FIG. 6 shows a section through the telescopic tube according to line VI—VI of FIG. 5;

DETAILED DESCRIPTION OF THE PREFERRED EMBODIMENT

Figure 1:
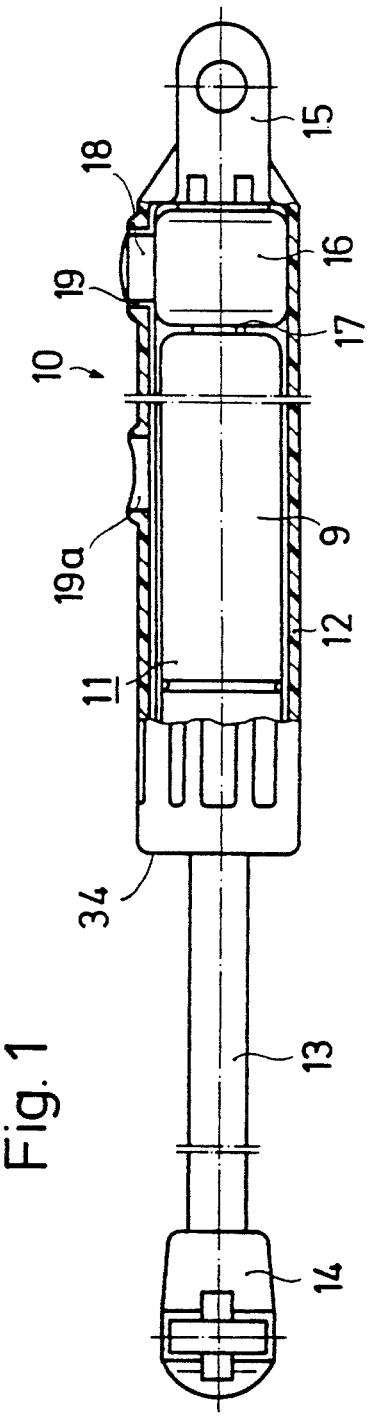
FIG. 1 shows a positioning device with a gas-filled spring which is longitudinally displaceable in an outer tube and can be locked in various catches adapted to engage a connecting element.

The positioning device 10 shown in FIG. 1 consists essentially of a gas-filled spring 11, which is disposed with its cylinder 9 for longitudinal displacement in a telescopic tube 12. The gas-filled spring 11 comprises a piston rod 13 which at its left-hand end is provided with a piston rod articulation 14. The telescopic tube 12 is open at one end. The piston rod 13 of the gas-filled spring 11 extends out of the open end, while at the closed end of the telescopic tube 12 there is a fixing lug 15 for attachment to the vehicle.

Figure 2:
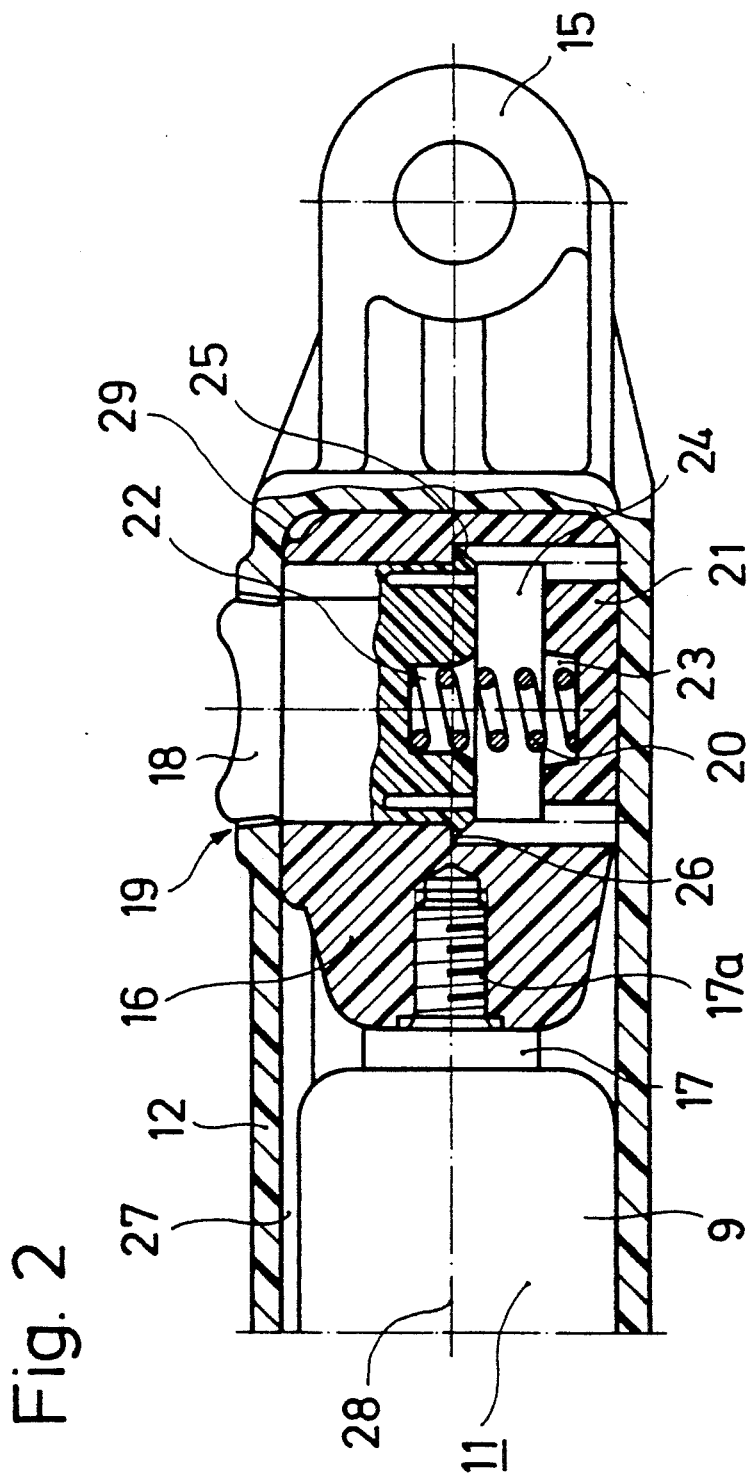
FIG. 2 is a detailed view of a locking element associated with a gas spring with the connecting element engaging a catch opening of a telescopic tube.

On the side remote from the piston rod 13, the cylinder 9 is connected by a connection 17 to a carrier 16. As FIG. 2 shows in detail, the connection 17 comprises a screw pin 17a by which it is screwed into the carrier 16. The carrier 16 comprises a locking element 18, e. g. a bolt, which is adapted for movement transversely to the longitudinal axis 28 of the telescopic tube 12 against the pressure of a spring 20. To this end, the carrier 16 has a bottom 21 in which there is a bottom spring mounting bore 23. The locking element 18 comprises an upper spring mounting bore 22 which is aligned with the bottom spring mounting bore 23. The spring 20 is constructed as a coil thrust spring and is fixed in the spring mounting bores 22 and 23. Between the bottom 21 and the locking element 18 there is a clear space 24 by which the locking element 18 can move transversely to the longitudinal axis 28 of the telescopic tube 12.

The telescopic tube 12 has in its bottom region a first catch opening 19 through which the locking element 18 is pressed radially outwardly by the spring 20 and engaged.

As FIG. 1 also shows, the telescopic tube 12 has in its longitudinal path at least one further catch opening 19a which corresponds to the fully-opened position of the corresponding engine bonnet or boot lid. As required, so various intermediate locking positions are provided.

In order to prevent the locking element 18 being pressed out of the carrier 16, it is provided with an inner snap element 25 which acts against a snap shoulder 26 and so limits the radial movement.

As shown in FIGS. 3 and 4, the carrier 16 comprises a guide projection 29 which is guided in the longitudinal groove 27 of the telescopic tube 12. The guide projection 29 thereby secures the carrier 16 against rotation and prevents rotating forces being transmitted to the locking element 18. The locking element 18 is thus guided freely from rotating forces and can be impressed into a recess 30 of the guide projection 29.

In order to be able to connect the carrier 16 to the gas-filled spring 11, as shown in FIG. 2, key surfaces 31 are provided which are opposite each other and which are offset by about 90° in respect of the guide projection 29. The key surfaces 31 are adapted to a corresponding tool by which a torque can be applied for screwing-up purposes.

In addition to the openings 19 and 19a, the telescopic tube 12 shown in FIG. 5 comprises spring tongues 32, such as are shown in detail in FIG. 6. The spring tongues 32 are provided by U-shaped stamped out parts 33 in the region of the open end 34 of the telescopic tube and are bent radially inwardly towards the cylinder 9.

The spring tongues 32, when the gas-filled spring 11 is inserted, bear on the cylinder 9 and prevent a relative radial movement. Noise due to relative radial movements between the telescopic tube 12 and the cylinder 9 are thus avoided. In the case of the example of embodiment shown, two oppositely disposed spring tongues are shown but if necessary, however, it is also possible to provide a plurality of spring tongues which are distributed over the periphery. In another embodiment, it may be advantageous to provide a plurality of radially inwardly directed spring tongues 32 which are distributed over the length of the telescopic tube 12.

Figure 7:
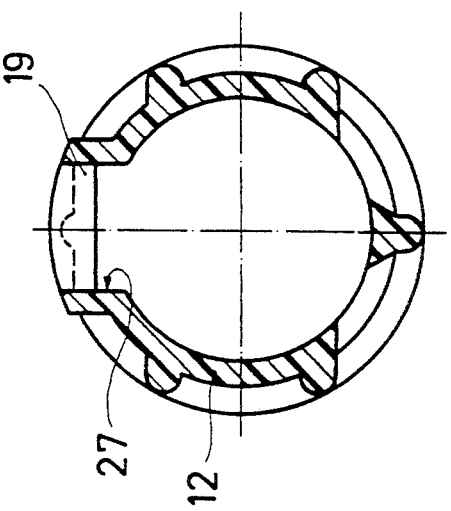
FIG. 7 shows a section through the telescopic tube according to line VII—VII of FIG. 5.

As FIG. 7 shows, the telescopic tube 12 is provided on the inside with a longitudinal groove 27 along which the locking element 18 slides. The locking element 18 is reliably guided in the longitudinal groove 27 by the guide projection 29 on the carrier 16 so that after release it reliably finds the next catch opening 19 or 19a and again engages securely by the pressure of the spring 20. This also prevents the cylinder 9 rotating in the telescopic tube 12 when the locking element 18 is released. An unintentional overextension of the cylinder 9 out of the telescopic tube 12 is in this way reliably avoided.

While a specific embodiment of the invention has been shown and described in detail to illustrate the application of the inventive principles, it will be understood that the invention may be embodied otherwise without departing from such principles.

The reference numerals in the claims are only used for facilitiating the understanding and are by no means restrictive.

We claim:

1. A positioning device for positioning two relatively movable construction elements in respective relative positions, comprising:

a cylinder piston unit, said cylinder piston unit (11) having as a first member (9) a cylinder member (9), with an axis (28) and two ends, and as a second member (13) a piston rod member (13) axially extending through one of said two ends;

a telescopic tube (12) axially movably guided on said first member (9), said telescopic tube (12) being axially lockable with respect to said first member (9) by releasable locking means (18, 19), said telescopic tube (12) being provided with first fastening means (15) for being fastened to one of said construction elements, the second member (13) being provided with second fastening means (14) for being fastened to the other one of said construction elements;

said releasable locking means (18, 19) comprising a locking element (18) axially fixed with respect to said first member (9) and at least one locking catch means (19) axially fixed with respect to said telescopic tube (12), said locking element (18) being engageable into and disengageable from said locking catch means (19) by respective movements with respect to said first member (9) substantially transverse to said axis (28);

said locking element (18) being biased by spring means (20) towards engagement with said locking catch means (19), and being releasable from engagement with said locking catch means (19) by an operator;

said locking element (18) being substantially radially guided within a carrier (16) fastened to said first member (9);

said carrier (16) being fastened to said first member (9) to one end thereof which first enters into said telescopic tube (12) when said cylinder piston unit (11) and said telescopic tube (12) are assembled; said carrier (16) being fastened to an axially extending fastening pin (17i a) of said one member (9).

2. A positioning device as set forth in claim 1, said locking catch means (19) being provided by a substantially radially directed opening (19) of said telescopic tube (12).

3. A positioning device as set forth in claim 1, said locking element (18) being non-rotatable with respect to said locking catch means (19).

4. A positioning device as set forth in claim 1, said locking element (18) being axially guided by a guiding groove (27) provided on an internal face of said telescopic tube (12).

5. A positioning device as set forth in claim 1, said carrier (16) being axially guided within said telescopic tube (12).

6. A positioning device as set forth in claim 1, said carrier (16) being non-rotatably guided within said telescopic tube (12).

7. A positioning device as set forth in claim 1, said carrier (16) having a projection (29) engaging into a substantially axially extending guiding groove (27) provided at an internal surface of said telescopic tube (12).

8. A positioning device as set forth in claim 7, said locking element (18) being circumferentially located such as to pass through said guiding groove (27).

9. A positioning device as set forth in claim 1, said locking element (18) being substantially radially guided within a substantially radially extending guiding bore (24) of said carrier (16).

10. A positioning device as set forth in claim 9, said locking element (18) being biased towards engagement with said locking catch means (19) by spring means (20) located within said guiding bore (24), said spring means (20) being supported by a bottom face (23) of the guiding bore (24) and acting onto an inner end face (22) of said locking element (18) located within said guiding bore (24).

11. A positioning device as set forth in claim 9, said locking element (18) being provided with snap means (25) snappingly engaging snap shoulder means (26), when said locking element (18) is inserted into said guiding bore (24), said snap means (25) and said snap shoulder means (26) defining an engagement position of said locking element (18) within said guiding bore (24), in which engagement position said locking element (18) engages said locking catch means (19).

12. A positioning device as set forth in claim 1, said telescopic tube (12) being provided with radially inwardly biased spring tongues (32) engaging an external face of said first member (9).

13. A positioning device as set forth in claim 12, at least one spring tongue (32) being established by a U-shaped slot (33) of the telescopic tube (12).

14. A positioning device as set forth in claim 12, a plurality of spring tongues (32) being distributed on the telescopic tube (12).

15. A positioning device as set forth in claim 1, said carrier (16) being in screw engagement with said first member (9), said carrier (16) being provided with at least one key surface (31) for applying a screwing tool.

16. A positioning device as set forth in claim 1, said carrier (16) being provided between an end of said cylinder member (9) and an opposite end wall of said telescopic tube (12).

17. A positioning device as set forth in claim 16, said first fastening means (15) being provided on said end wall.

18. A positioning device as set forth in claim 1, a plurality of locking catch means (19,19a) being provided in axial alignment along said telescopic tube (12).

19. A positioning device as set forth in claim 18, first locking catch means (19) being provided on said telescopic tube (12) at a location corresponding to a most inward position of said first member (9) within said telescopic tube (12) and a second locking catch means (19a) being provided on said telescopic tube (12) at a location corresponding to a more outward position of said first member (9) within said telescopic tube (12).

20. A positioning device as set forth in claim 1, damping means (32) being provided for damping axial movement of said telescopic tube (12) with respect to said one member (9).

21. A positioning device as set forth in claim 1, said cylinder piston unit (11) being a gas spring.

22. A positioning device as set forth in claim 21, said piston rod member (13) of said gas spring (11) being axially biased with respect to said cylinder member (9) towards an outermost position.

23. A positioning device for positioning two relatively movable construction elements in respective relative positions, comprising:
a cylinder piston unit (11), said cylinder piston unit (11) having as a first member (9) a cylinder member (9), with an axis (28) and two ends, and as a second member (13) a piston rod member (13) axially extending through one of said two ends;
a telescopic tube (12) axially movably guided on said first member (9,) said telescopic tube (12) being provided with first fastening means (15) for being fastened to one of said construction elements, the second member (13) being provided with second fastening means (14) for being fastened to the other one of said construction elements;
said telescopic tube (12) being provided with radially inwardly biased spring tongues (32) engaging an external face of said first member (9), said spring tongues (32) extending substantially in an axial direction of said telescopic tube (12), said spring tongues being integral with said telescopic tube (12) adjacent one axial end of said spring tongues (32), and said spring tongues (32) being separated from said telescopic tube (12) by a substantially U-shaped slot (33) adjacent another axial end of said spring tongues (32).

24. A positioning device for positioning two relatively movable construction elements in respective relative positions, comprising:
a cylinder piston unit (11), including a cylinder member (9) and a piston rod member (13) extending axially through an end of said cylinder member (9);
a telescopic tube (12) axially movably guided on said cylinder member (9);
first fastening means (15) on said telescopic tube (12) for attachment to one of the construction elements to be positioned;
second fastening means (14) on said piston rod member (13) for attachment to the other of the elements to be positioned;
locking catch means (19, 19a) carried by said telescopic tube (12) in axially fixed relation thereto;

a locking element (18) carried by said cylinder member in axially fixed relation thereto for movement transversely of the cylinder axis into and out of locking engagement with said locking catch means (19, 19a);

spring means (20) for biasing said locking element (18) towards engagement with said locking catch means (19, 19a) and for permitting transverse movement of said locking element (18) out of engagement with said locking catch means (19, 19a) by an operator;

means defining an axially-extending groove (27) in the internal face of said telescopic tube (12), said groove being radially outwardly closed by the wall of said telescopic tube (12); and means (29) carried by said cylinder member (9) for axially-sliding engagement with said groove (27) to guide said telescopic tube (12) in axial non-rotational movement relative to said cylinder member (9).

* * * * *

UNITED STATES PATENT AND TRADEMARK OFFICE
CERTIFICATE OF CORRECTION

PATENT NO. : 5,158,268
DATED      : October 27, 1992
INVENTOR(S): Klaus Schnitzius et al.

It is certified that error appears in the above-identified patent and that said Letters Patent is hereby corrected as shown below:

Col. 7, line 2, "to one end" should read --at one end--;
Col. 7, line 6, "(17i a)" should read --(17a)--.

Signed and Sealed this

Thirtieth Day of November, 1993

Attest:

BRUCE LEHMAN

Attesting Officer

Commissioner of Patents and Trademarks